United States Patent
Haga et al.

(10) Patent No.: US 10,658,704 B2
(45) Date of Patent: May 19, 2020

(54) METHOD OF MANUFACTURING ELECTRODE LAMINATE AND METHOD OF MANUFACTURING ALL-SOLID-STATE BATTERY

(71) Applicant: Toyota Jidosha Kabushiki Kaisha, Toyota-shi, Aichi-ken (JP)

(72) Inventors: Kengo Haga, Susono (JP); Junichiro Nishino, Gotenba (JP); Norihiro Ose, Shizuoka-ken (JP); Hajime Hasegawa, Susono (JP); Mitsutoshi Otaki, Susono (JP); Hiroki Kubo, Susono (JP); Keisuke Omori, Kariya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/274,191

(22) Filed: Sep. 23, 2016

(65) Prior Publication Data
US 2017/0092987 A1    Mar. 30, 2017

(30) Foreign Application Priority Data
Sep. 24, 2015 (JP) .................... 2015-187457

(51) Int. Cl.
*H01M 4/02* (2006.01)
*H01M 10/0585* (2010.01)
(Continued)

(52) U.S. Cl.
CPC ....... *H01M 10/0585* (2013.01); *H01M 4/043* (2013.01); *H01M 4/0404* (2013.01);
(Continued)

(58) Field of Classification Search
CPC ...... H01M 4/02; H01M 4/0404; H01M 4/043; H01M 4/0435; H01M 2004/028;
(Continued)

(56) References Cited

U.S. PATENT DOCUMENTS

| | | | |
|---|---|---|---|
| 2003/0180620 A1* | 9/2003 | Nakane | H01M 4/0471 429/231.95 |
| 2005/0069775 A1* | 3/2005 | Hwang | H01M 4/131 429/231.95 |

(Continued)

FOREIGN PATENT DOCUMENTS

| JP | 2012-175016 | * | 8/2012 |
|---|---|---|---|
| JP | 2014-207104 A | | 10/2014 |

(Continued)

*Primary Examiner* — Tabassom Tadayyon Eslami
(74) *Attorney, Agent, or Firm* — Dinsmore & Shohl LLP

(57) ABSTRACT

A method of manufacturing an electrode laminate, which includes an active material layer and a solid electrolyte layer formed on the active material layer, includes: an active material layer forming step of forming an active material layer; and a solid electrolyte layer forming step of forming a solid electrolyte layer on the active material layer by applying a solid electrolyte layer-forming slurry to the active material layer and drying the solid electrolyte layer-forming slurry. In this method, a surface roughness Ra value of the active material layer is 0.29 μm to 0.98 μm when calculated using a laser microscope.

19 Claims, 2 Drawing Sheets

(51) Int. Cl.
*H01M 10/0562* (2010.01)
*H01M 4/04* (2006.01)

(52) U.S. Cl.
CPC ..... *H01M 4/0407* (2013.01); *H01M 10/0562* (2013.01); *H01M 2004/021* (2013.01)

(58) Field of Classification Search
CPC ....... H01M 2004/8689; H01M 4/5815; H01M 4/04; H01M 4/0407
USPC ............................... 429/104, 304, FOR. 128
See application file for complete search history.

(56) References Cited

U.S. PATENT DOCUMENTS

| | | | | |
|---|---|---|---|---|
| 2010/0279176 | A1* | 11/2010 | Ogawa | H01M 4/131 429/304 |
| 2012/0183835 | A1* | 7/2012 | Young | H01M 10/345 429/149 |
| 2013/0017432 | A1* | 1/2013 | Roumi | H01M 2/1686 429/145 |
| 2015/0017510 | A1* | 1/2015 | Terado | H01M 2/145 429/144 |
| 2015/0162614 | A1* | 6/2015 | Koshika | H01M 4/13 429/189 |

FOREIGN PATENT DOCUMENTS

| | | | |
|---|---|---|---|
| JP | 2015-008073 A | | 1/2015 |
| WO | WO2013/12009 | * | 9/2013 |
| WO | WO 2014/002483 | * | 1/2014 |

\* cited by examiner

METHOD OF MANUFACTURING ELECTRODE LAMINATE AND METHOD OF MANUFACTURING ALL-SOLID-STATE BATTERY

CROSS REFERENCE TO RELATED APPLICATIONS

This application claims priority of Japanese Patent Application No. 2015-187457 filed on Sep. 24, 2015 which is incorporated herein by reference in its entirety including the specification, drawings and abstract.

BACKGROUND

1. Technical Field

The present disclosure relates to a method of manufacturing an electrode laminate for an all-solid-state battery, the electrode laminate including an active material layer and a solid electrolyte layer that is provided on the active material layer. The present disclosure also relates to a method of manufacturing an all-solid-state battery.

2. Description of Related Art

Recently, an all-solid-state battery in which an electrolytic solution is replaced with a solid electrolyte has attracted attention. Compared to secondary batteries in which an electrolytic solution is used, an electrolytic solution is not used in an all-solid-state battery. Therefore, for example, the decomposition of an electrolytic solution caused by overcharging does not occur, and cycle durability and energy density are high.

For example, an all-solid-state battery has a structure in which a positive electrode current collector layer, a positive electrode active material layer, a solid electrolyte layer, a negative electrode active material layer, and a negative electrode current collector layer are laminated. In order to improve the energy density and performance of the all-solid-state battery having the above structure, in general, it is preferable that the amount of an active material in the all-solid-state battery is large and that the thickness of the solid electrolyte layer is as thin as possible. In particular, in a case where the thickness of the solid electrolyte layer can be made small, the active material can be further incorporated into the all-solid-state battery in an amount corresponding to the reduced thickness of the solid electrolyte layer. As a result, the energy density can be improved, and the internal resistance of the battery can be reduced.

However, in a case where the thickness of the solid electrolyte layer is small, a portion of the solid electrolyte layer is damaged due to, for example, manufacturing conditions of the solid electrolyte layer, and thus short-circuiting is more likely to occur in the all-solid-state battery. Accordingly, a method of manufacturing an all-solid-state battery capable of preventing short-circuiting while reducing the thickness of a solid electrolyte layer has been studied.

A method of manufacturing an all-solid-state battery disclosed in Japanese Patent Application Publication No. 2015-008073 (JP 2015-008073 A) includes a step of applying a solid electrolyte layer-forming slurry to an active material layer to form a solid electrolyte layer thereon. JP 2015-008073 A describes that the active material layer may be pressed before applying the solid electrolyte layer-forming slurry thereto.

SUMMARY

In regard to this point, the present inventors discovered the following points: in a case where the surface of the active material layer on which the solid electrolyte layer is not formed is excessively rough, the thickness of the solid electrolyte layer varies, that is, thin and thick portions are present in the solid electrolyte layer; and in a case where the surface of the active material layer on which the solid electrolyte layer is not formed is excessively smooth, the interface resistance between the solid electrolyte layer and the active material layer increases.

The present disclosure provides a method of manufacturing an electrode laminate and a method of manufacturing an all-solid-state battery, with which short-circuiting can be prevented while reducing the thickness of a solid electrolyte layer and with which the internal resistance of a battery can be reduced.

According to a first aspect of the disclosure, there is provided a method of manufacturing an electrode laminate, the method including: an active material layer forming step of forming an active material layer; and a solid electrolyte layer forming step of forming a solid electrolyte layer on the active material layer by applying a solid electrolyte layer-forming slurry to the active material layer and drying the solid electrolyte layer-forming slurry.

In the method, a surface roughness Ra value of the active material layer is 0.29 μM to 0.98 μm when calculated using a laser microscope under the following measurement conditions <1> and <2>:

<1> standards defined in ISO 4288: 1996; and
<2> an evaluation length of 0.8 mm.

The active material layer forming step may include a step of pressing the active material layer.

According to a second aspect of the disclosure, there is provided a method of manufacturing an all-solid-state battery, the method including: an active material layer forming step of forming a positive electrode active material layer and a negative electrode active material layer on a positive electrode current collector layer and a negative electrode current collector layer, respectively; a solid electrolyte layer forming step of forming a solid electrolyte layer on at least one of the positive electrode active material layer or the negative electrode active material layer by applying a solid electrolyte layer-forming slurry to the at least one of the positive electrode active material layer or the negative electrode active material layer and drying the solid electrolyte layer-forming slurry; and a joining step of laminating the positive electrode current collector layer, the positive electrode active material layer, the solid electrolyte layer, the negative electrode active material layer, and the negative electrode current collector layer in this order and joining the positive electrode current collector layer, the positive electrode active material layer, the solid electrolyte layer, the negative electrode active material layer, and the negative electrode current collector layer to each other such that the solid electrolyte layer is interposed between the positive electrode active material layer and the negative electrode active material layer.

In this method, a surface roughness Ra value of a surface of the active material layer to which the solid electrolyte layer-forming slurry is applied is 0.29 μm to 0.98 μm when calculated using a laser microscope under the following measurement conditions <1> and <2>:

<1> standards defined in ISO 4288: 1996; and
<2> an evaluation length of 0.8 mm.

According to the present disclosure, a method of manufacturing an electrode laminate and a method of manufacturing an all-solid-state battery can be provided, with which short-circuiting can be prevented while reducing the thickness of a solid electrolyte layer and with which the internal resistance of a battery can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
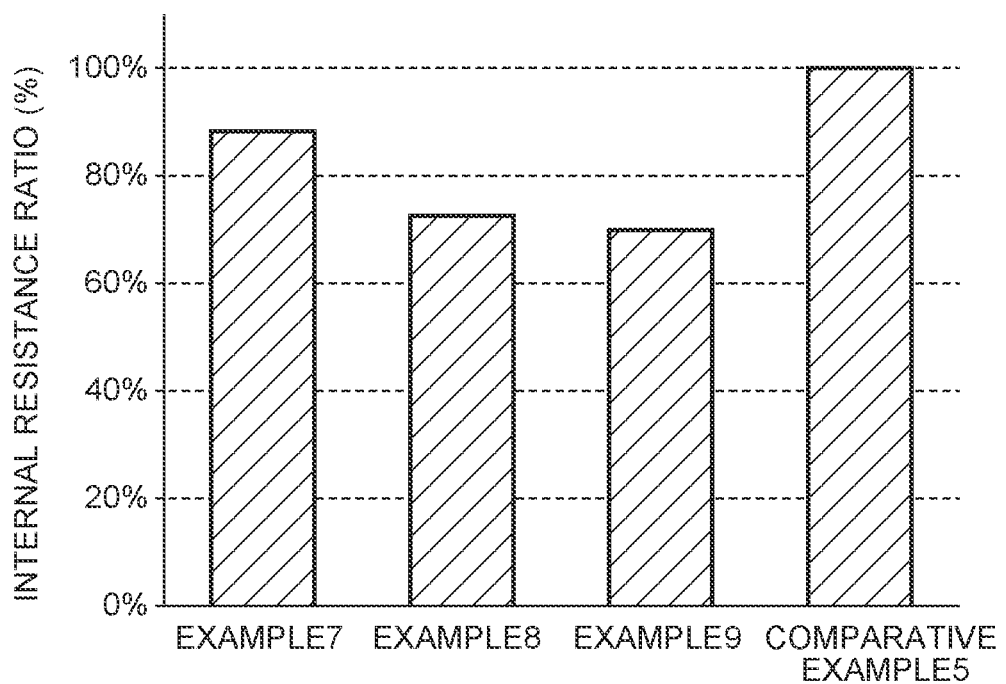
FIG. 1 is a diagram showing internal resistance ratios (%) of all-solid-state batteries according to Examples 7 to 9 and Comparative Example 5.

Hereinafter, embodiments of the disclosure will be described in detail. The disclosure is not particularly limited to the following embodiment. In the drawings, a dimensional ratio is changed for convenience of description and may be different from an actual dimensional ratio. Further, in the description of the drawings, like reference numerals represent like components, and the description thereof will not be repeated.

In the embodiment according to the disclosure, the surface roughness Ra (also referred to as "arithmetic average roughness") refers to a value calculated using a laser microscope under measurement conditions: standards defined in ISO 4288:1996; and an evaluation length of 0.8 mm.

<<Electrode Laminate>>

A method of manufacturing an electrode laminate according to an embodiment of the disclosure, which includes an active material layer and a solid electrolyte layer formed on the active material layer, includes: an active material layer forming step of forming an active material layer; and a solid electrolyte layer forming step of forming a solid electrolyte layer on the active material layer by applying a solid electrolyte layer-forming slurry to the active material layer and drying the solid electrolyte layer-forming slurry.

In the process of manufacturing an electrode laminate, in particular, an electrode laminate for an all-solid-state battery, in general, a solid electrolyte layer is formed on an active material layer, for example, using a method including: disposing a solid electrolyte layer, which is prepared in another step, on an active material layer; and pressing these layers. However, in consideration of the actual manufacturing process, this method is not preferable because, for example, it has a large number of procedures and is complicated.

On the other hand, in the method of manufacturing an electrode laminate according to the embodiment of the disclosure, an active material layer can be formed on a solid electrolyte layer by directly applying a solid electrolyte layer-forming slurry to the active material layer and drying the solid electrolyte layer-forming slurry. Therefore, in the method of manufacturing an electrode laminate according to the embodiment of the disclosure, the number of procedures can be reduced and simplified compared to a method of manufacturing an electrode laminate in the related art.

However, from the viewpoint of improving energy density, ionic conductance, and the like as described above, it is preferable that the thickness of the solid electrolyte layer is as small as possible. In regard to this point, the present inventors found the following possibility when the solid electrolyte layer-forming slurry is directly applied to the active material layer.

That is, in a case where the surface of the active material layer on which the solid electrolyte layer is not formed is excessively rough, the thickness of the solid electrolyte layer varies, that is, thin and thick portions are present in the solid electrolyte layer. As a result, short-circuiting is likely to occur, particularly, in a thin portion of the solid electrolyte layer. Further, in a case where the surface of the active material layer is excessively smooth before the solid electrolyte layer is not formed, the interface resistance between the solid electrolyte layer and the active material layer may increase. As a result, the internal resistance of a battery, in particular, an all-solid-state battery is likely to increase.

Figure 2A:
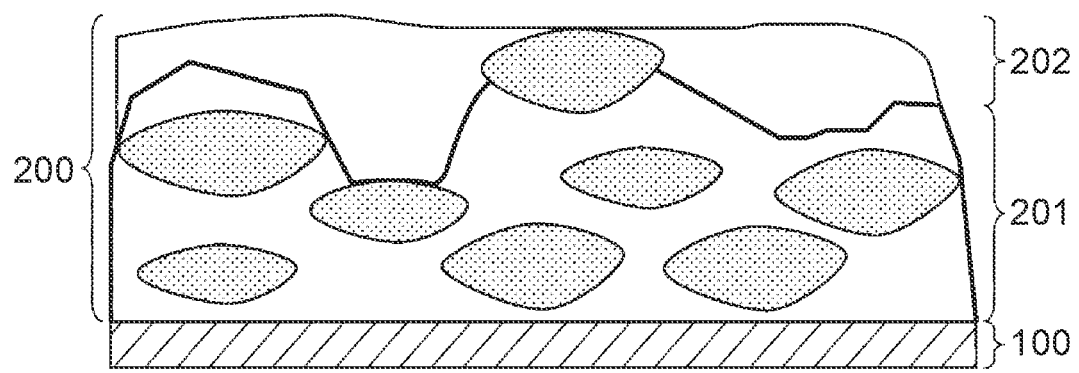
FIG. 2A is a schematic diagram showing an electrode laminate in which a solid electrolyte layer is formed on an active material layer having a rough surface.
Figure 2B:
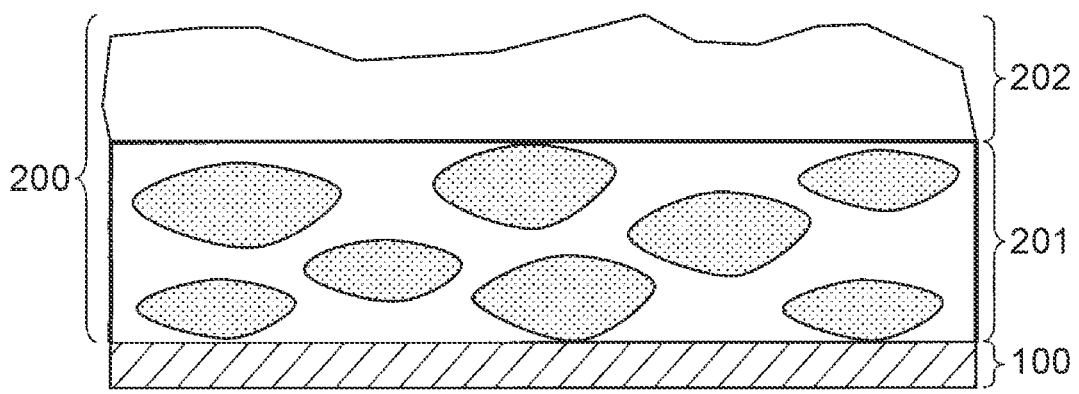
FIG. 2B is a schematic diagram showing an electrode laminate in which a solid electrolyte layer is formed on an active material layer having a smooth surface.

FIG. 2A is a schematic diagram showing an electrode laminate in which a solid electrolyte layer is formed on an active material layer having a rough surface. FIG. 2B is a schematic diagram showing an electrode laminate in which a solid electrolyte layer is formed on an active material layer having a smooth surface.

In each of FIGS. 2A and 2B, an active material layer 201 and a solid electrolyte layer 202 are laminated on a current collector layer 100 in this order, and an electrode laminate 200 includes the active material layer 201 and the solid electrolyte layer 202.

In FIG. 2A, the thickness of the solid electrolyte layer 202 formed on the active material layer 201 varies, that is, thin and thick portions are present in the solid electrolyte layer 202. As a result, short-circuiting is likely to occur, particularly, in a thin portion of the solid electrolyte layer 202. In FIG. 2B, the interface resistance between the active material layer 201 and the solid electrolyte layer 202 formed on the active material layer 201 increases. As a result, the internal resistance of a battery is likely to increase.

Accordingly, the present inventors performed a thorough investigation on the active material layer on which the solid electrolyte layer is formed, in particular, the surface roughness thereof, thereby obtaining means for solving the problems.

<Surface Roughness of Active Material Layer>

That is, in the method of manufacturing an electrode laminate according to the embodiment of the disclosure, a surface roughness Ra value of the active material layer is 0.29 μm to 0.98 μm when calculated using a laser microscope under the following measurement conditions <1> and <2>:

<1> standards defined in ISO 4288:1996; and
<2> an evaluation length of 0.8 mm.

According to this configuration, by adjusting the surface roughness Ra value of the active material layer to be in the above-described range, an electrode laminate can be manufactured, with which short-circuiting can be prevented while reducing the thickness of a solid electrolyte layer and with which the internal resistance of a battery can be reduced.

In general, as the area of the active material layer increases, the thickness of the solid electrolyte layer is more likely to vary, that is, thin and thick portions are more likely to be present in the solid electrolyte layer. As a result, short-circuiting is more likely to occur. However, in the method of manufacturing an electrode laminate according to the embodiment of the disclosure, even in a case where an active material layer having a large area is used, short-circuiting can be prevented while reducing the thickness of a solid electrolyte layer. Accordingly, the method according to the embodiment of the disclosure is particularly suitable in a case where a solid electrolyte layer is formed on an active material layer having a large area.

The surface roughness Ra value of the active material layer is preferably 0.29 μm or higher or 0.39 μm or higher from the viewpoint of preventing short-circuiting, and is preferably 0.98 μm or lower, 0.57 μm or lower, or 0.55 μm or lower from the viewpoint of reducing the interface resistance between the active material layer and the solid electrolyte layer.

The thickness of the solid electrolyte layer-forming slurry layer and/or the thickness of the solid electrolyte layer are not particularly limited and is preferably 5 μm or more, 10 μm or more, or 15 μm or more and/or is preferably 50 μm or less, 30 μm or less, or 20 μm or less from the viewpoint of improving energy density, ionic conductance, and the like of a battery into which the electrode laminate manufactured using the method according to the embodiment of the disclosure is incorporated.

<Active Material Layer Forming Step>

The active material layer forming step is not particularly limited, and a well-known step can be adopted. Examples of the active material layer forming step include a step of applying an active material layer-forming slurry to a current collector layer formed of a metal to form an active material layer-forming slurry layer thereon and drying and/or firing the active material layer-forming slurry layer.

A method of applying the slurry is not particularly limited and a well-known coating method can be adopted. Examples of the coating method include methods using a blade coater, a gravure coater, a dipping coater, a reverse coater, a roll knife coater, a wire bar coater, a slot die coater, an air knife coater, a curtain coater, an extrusion coater, and a combination thereof.

Further, a time and a temperature during the drying and/or firing of the slurry are not particularly limited. For example, the slurry is dried and/or fired at a temperature of normal temperature to 500° C. for 30 minutes to 24 hours.

(Pressing Step)

It is preferable that the active material layer forming step includes a pressing step. The pressing step is not particularly limited, and a well-known pressing step may be adopted. In the related art, one of the purposes for performing a pressing step of an active material layer forming step is to smoothen the active material layer, in particular, a surface thereof. However, the present inventors found that, in a case where the surface roughness of an active material layer is very low, that is, the surface thereof is smooth, the interface resistance increases. Based on this result, the present inventors conceived a technique of controlling the surface roughness Ra of the active material layer in the pressing step.

<Solid Electrolyte Layer Forming Step>

The solid electrolyte layer forming step is not particularly limited, and a well-known step can be adopted. Examples of the solid electrolyte layer forming step include a step of applying a solid electrolyte layer-forming slurry to the active material layer to form a solid electrolyte layer-forming slurry layer thereon and drying and/or firing the solid electrolyte layer-forming slurry layer. A method of applying the slurry, and a temperature and a time during drying and firing can refer to the description regarding the active material layer forming step.

<Active Material Layer and Active Material Layer-Forming Slurry Layer>

The active material layer is formed by drying and/or firing the active material layer-forming slurry layer. Further, the active material layer-forming slurry layer is formed by applying the active material layer-forming slurry. Examples of the active material layer-forming slurry include a positive electrode active material layer-forming slurry and a negative electrode active material layer-forming slurry.

(Positive Electrode Active Material Layer-Forming Slurry)

The positive electrode active material layer-forming slurry includes a positive electrode active material and optionally further includes a conductive additive, a binder, a solid electrolyte, and a dispersion medium.

As the positive electrode active material, a metal oxide containing at least one transition metal selected from lithium, manganese, cobalt, nickel, and titanium can be used. Examples of the positive electrode active material include lithium cobalt oxide, lithium nickel oxide, lithium nickel manganese cobalt oxide, and a combination thereof The form of the positive electrode active material is preferably powder. The average particle size of the positive electrode active material is not particularly limited, and is, for example, 1 μm or more, 3 μm or more, 5 μm or more, or 10 μm or more and is, for example, 100 μm or less, 50 μm or less, 30 μm or less, or 20 μm or less. The average particle size of the positive electrode active material is preferably in a range of 1 μm to 50 μm, more preferably in a range of 1 μm to 20 μm, still more preferably in a range of 1 μm to 10 μm, and even still more preferably in a range of 1 μm to 6 μm.

In the embodiment of the disclosure, the particle size of a particle can be obtained by directly measuring the projected area equivalent circle diameter of the particle based on an image obtained by observation using a scanning electron microscope (SEM) or the like. The average particle size can be obtained by measuring the particle sizes of ten or more particles and obtaining the average thereof.

Further, the positive electrode active material optionally further includes a buffer film. The buffer film can prevent production of a metal sulfide having a high electric resistance generated by a chemical reaction between the positive electrode active material and the solid electrolyte. Alternatively, the buffer film prevents the growth of a lithium ion depletion layer (space charge layer) and can improve the output of an all-solid-state battery.

It is preferable that the buffer film has an anionic species which exhibits electron insulating properties and ion conductivity and has a strong cation trapping force. Examples of the buffer film include a solid oxide electrolyte such as lithium niobate ($LiNbO_3$). However, the buffer film is not limited to the example.

Examples of the conductive additive include: a carbon material such as vapor grown carbon fiber (VGCF), carbon black, Ketjen black, carbon nanotube, or carbon nanofiber; a metal material; and a combination thereof.

The binder is not particularly limited and examples thereof include a polymer resin such as polyvinylidene fluoride (PVDF), butadiene rubber (BR), styrene-butadiene rubber (SBR), styrene-ethylene-butylene-styrene block copolymer (SEBS), or carboxymethyl cellulose (CMC) and a combination thereof.

The solid electrolyte is not particularly limited, and a raw material which can be used as a solid electrolyte can be used. Examples of the solid electrolyte include: an amorphous sulfide solid electrolyte such as $Li_2S$—$P_2S_5$; an amorphous oxide solid electrolyte such as $Li_2O$—$B_2O_3$—$P_2O_5$; a crystal oxide solid electrolyte such as $Li_{1.3}Al_{0.3}Ti_{0.7}(PO_4)_3$ or $Li_{1+x+y}A_xTi_{2-x}Si_yP_{3-y}O_{12}$ (A represents Al or Ga; $0 \leq x \leq 0.4$, $0 < y \leq 0.6$); and a combination thereof. An amorphous sulfide solid electrolyte is preferably used from the viewpoint of obtaining satisfactory lithium ion conductivity.

The form of the solid electrolyte is preferably powder. For example, the particle size of particles of the solid electrolyte is preferably in a range of 0.1 µm to 20 µm, more preferably in a range of 0.2 µm to 10 µm, still more preferably in a range of 0.3 µm to 6 µm, and even still more preferably in a range of 0.5 µm to 3 µm.

The dispersion medium is not particularly limited as long as it is stably present in the active material layer. Examples of the dispersion medium include a nonpolar solvent, a polar solvent, and a combination thereof. Examples of the nonpolar solvent include heptane, xylene, toluene, and a combination thereof. Examples of the polar solvent include a tertiary amine solvent such as triethyl amine; an ether solvent such as cyclopentyl methyl ether; a thiol solvent such as ethane mercaptan; an ester solvent such as butyl butyrate; and a combination thereof.

(Negative Electrode Active Material Layer-Forming Slurry)

The negative electrode active material layer-forming slurry includes a negative electrode active material and optionally further includes a conductive additive, a binder, a solid electrolyte, and a dispersion medium.

The negative electrode active material is not particularly limited as long as it can store and release, for example, metal ions such as lithium ions. Examples of the negative electrode active material include: a metal such as Li, Sn, Si, or In; an alloy of lithium and titanium, magnesium, or aluminum; a carbon material such as hard carbon, soft carbon, or graphite; and a combination thereof.

The conductive additive, the binder, the solid electrolyte, and the dispersion medium of the negative electrode active material layer-forming slurry can refer to the description regarding the positive electrode active material layer-forming slurry.

<Solid Electrolyte Layer and Solid Electrolyte Layer-Forming Slurry>

The solid electrolyte layer is included in the electrode laminate including the active material layer and the current collector layer. The solid electrolyte layer is formed by drying and/or firing the solid electrolyte layer-forming slurry layer. Further, the solid electrolyte layer-forming slurry layer is formed by applying the solid electrolyte layer-forming slurry.

The solid electrolyte layer-forming slurry includes a solid electrolyte and optionally further includes a binder and a dispersion medium. The solid electrolyte and the optional components including the binder and the dispersion medium of the solid electrolyte layer-forming slurry can refer to the description regarding the positive electrode active material layer-forming slurry.

<<Method of Manufacturing all-Solid-State Battery>>

A method of manufacturing an all-solid-state battery according to the embodiment of the disclosure including a positive electrode current collector layer, a positive electrode active material layer, a solid electrolyte layer, a negative electrode active material layer, and a negative electrode current collector layer in this order includes: an active material layer forming step of forming a positive electrode active material layer and a negative electrode active material layer on a positive electrode current collector layer and a negative electrode current collector layer, respectively; a solid electrolyte layer forming step of forming a solid electrolyte layer on at least one of the positive electrode active material layer or the negative electrode active material layer by applying a solid electrolyte layer-forming slurry to the active material layer and drying the solid electrolyte layer-forming slurry; and a joining step of laminating the positive electrode current collector layer, the positive electrode active material layer, the solid electrolyte layer, the negative electrode active material layer, and the negative electrode current collector layer in this order and joining these layers to each other such that the solid electrolyte layer is interposed between the positive electrode active material layer and the negative electrode active material layer.

In the method of manufacturing an all-solid-state battery according to the embodiment of the disclosure, an active material layer is formed on a solid electrolyte layer by directly applying a solid electrolyte layer-forming slurry to the active material layer and drying the solid electrolyte layer-forming slurry. Therefore, in the method of manufacturing an all-solid-state battery according to the embodiment of the disclosure, the number of procedures can be reduced and simplified compared to a method of manufacturing an all-solid-state battery in the related art in which a solid electrolyte layer is formed first and then is laminated on an active material layer.

<Surface Roughness of Active Material Layer>

In the method of manufacturing an all-solid-state battery according to the embodiment of the disclosure, a surface roughness Ra value of a surface of the active material layer to which the solid electrolyte layer-forming slurry is applied is 0.29 µm to 0.98 µm when calculated using a laser microscope under the following measurement conditions <1> and <2>:

<1> standards defined in ISO 4288:1996; and

<2> an evaluation length of 0.8 mm.

According to this configuration, by adjusting the surface roughness Ra value of the active material layer to be in the above-described range, an all-solid-state battery can be manufactured, with which short-circuiting can be prevented while reducing the thickness of a solid electrolyte layer and with which the internal resistance of a battery can be reduced.

<Joining Step>

In the joining step, the positive electrode current collector layer, the positive electrode active material layer, the solid electrolyte layer, the negative electrode active material layer, and the negative electrode current collector layer are laminated in this order and then are pressed. The pressure, temperature, and time during pressing are not particularly limited. For example, the layers are pressed at a temperature of normal temperature to 300° C. under a pressure of 0 MPa to 1000 MPa for 1 minute to 24 hours. As a result, the filling factor of each of the layers constituting the all-solid-state battery is increased, the contact area between adjacent layers and the contact area of solid-solid interfaces between particles is increased, and thus the ion conduction resistance can be reduced.

<Current Collector Layer>

Examples of the current collector layer include a positive electrode current collector layer and a negative electrode current collector layer. The positive electrode current collector layer or the negative electrode current collector layer can be formed of various metals such as silver, copper, gold, aluminum, nickel, iron, stainless steel, or titanium, or alloys thereof without any particular limitation. From the viewpoint of chemical stability, the positive electrode current collector layer is preferably formed of aluminum, and the negative electrode current collector layer is preferably formed of copper.

In the method of manufacturing an all-solid-state battery according to the embodiment of the disclosure, layer forming steps, a method of applying the slurry, a time and a temperature during the drying and firing of the slurry layer, a pressure during pressing, and raw materials of the respective layers and the respective slurries can refer to the description regarding the method of manufacturing an electrode laminate.

The disclosure will be described in more detail with reference to the following Examples. However, it is needless to say that the scope of the disclosure is not limited to these Examples.

Comparative Example 1

Preparation of Negative Electrode Active Material Layer

A negative electrode mixture as a raw material of a negative electrode active material layer was put into a polypropylene (PP) case. The negative electrode mixture was stirred for 30 seconds using an ultrasonic disperser (Model name: UH-50, manufactured by SMT Corporation) and was shaken for 30 seconds using a shaker (Model name: TTM-1, manufactured by Sibata Scientific Technology Ltd.). As a result, a negative electrode active material layer-forming slurry was prepared.

With a blade method using an applicator, this negative electrode active material layer-forming slurry was applied to a Cu foil as a negative electrode current collector layer to form a negative electrode active material layer-forming slurry layer thereon. The negative electrode active material layer-forming slurry layer was dried on a hot plate at 100° C. for 30 minutes. As a result, a negative electrode active material layer formed on the Cu foil was obtained. The configuration of the negative electrode mixture was as follows:

Natural graphite-based carbon as a negative electrode active material (manufactured by Mitsubishi Chemical Corporation, average particle size: 10 μm);

Heptane as a dispersion medium;

Butyl butyrate (5 mass %) containing a PVDF binder as a binder; and $Li_2S$—$P_2S_5$ glass ceramic containing LiI as a solid electrolyte (average particle size: 0.8 μm).

<Adjustment of Surface Roughness of Negative Electrode Active Material Layer>

In the negative electrode active material layer according to Comparative Example 1, the surface roughness value thereof was not adjusted using a roll press or the like.

Examples 1 and 2 and Comparative Examples 2 to 3

Negative electrode active material layers according to Examples 1 and 2 and Comparative Examples 2 and 3 were prepared using the same preparation method as that of the negative electrode active material layer according to Comparative Example 1, except that they were roll-pressed to adjust the surface roughness values thereof. In the negative electrode active material layers according to Comparative Example 2, Examples 1 and 2, and Comparative Example 3, the pressure during the pressing was 13 kN/cm, the feed rate was 0.5 m/min, and the gaps between rolls were 450 μm, 400 μm, 300 μm, and 100 μm, respectively.

Example 3

Preparation of Positive Electrode Active Material Layer

A positive electrode mixture as a raw material of a positive electrode active material layer was put into a polypropylene (PP) case. The positive electrode mixture was stirred for 30 seconds using an ultrasonic disperser (Model name: UH-50, manufactured by SMT Corporation), was shaken for 3 minutes using a shaker (Model name: TTM-1, manufactured by Sibata Scientific Technology Ltd.), and was further stirred using the ultrasonic disperser for 30 seconds. As a result, a positive electrode active material layer-forming slurry was prepared.

With a blade method using an applicator, this positive electrode active material layer-forming slurry was applied to an Al foil as a positive electrode current collector layer to form a positive electrode active material layer-forming slurry layer thereon. The positive electrode active material layer-forming slurry layer was dried on a hot plate at 100° C. for 30 minutes. As a result, a positive electrode active material layer formed on the Al foil was obtained. The configuration of the positive electrode mixture was as follows:

$LiNi_{1/3}Co_{1/3}Mn_{1/3}O_2$ (average particle size: 4 μm) as a positive electrode active material;

Heptane as a dispersion medium;

VGCF as a conductive additive;

Butyl butyrate solution (5 mass %) containing a PVDF binder as a binder; and $Li_2S$—$P_2S_5$ glass ceramic containing LiI as a solid electrolyte (average particle size: 0.8 μm).

<Adjustment of Surface Roughness of Positive Electrode Active Material Layer>

In the positive electrode active material layer according to Example 3, the surface roughness value thereof was not adjusted using a roll press or the like.

Examples 4 to 6 and Comparative Example 4

Positive electrode active material layers according to Examples 4 to 6 and Comparative Example 4 were prepared using the same preparation method as that of the positive electrode active material layer according to Example 3, except that they were roll-pressed to adjust the surface roughness values thereof. In the positive electrode active material layers according to Examples 4 to 6 and Comparative Example 4, the pressure during the pressing was 13 kN/cm, the feed rate was 0.5 m/min, and the gaps between rolls were 375 μm, 350 μm, 300 μm, and 100 μm, respectively.

<<Evaluation>>

The surface roughness value of an active material layer was evaluated, and the short-circuiting and internal resistance of an all-solid-state battery into which an electrode laminate was incorporated were evaluated.

<Evaluation of Surface Roughness of Active Material Layer>

The surface roughness values of the negative electrode active material layers according to Examples 1 and 2 and Comparative Examples 1 to 3 and the positive electrode active material layer according to Examples 3 to 6 and Comparative Example 4, which were obtained after application and drying or after application, drying, and roll-pressing, were evaluated. The surface roughness Ra of each of the active material layers was measured using a laser microscope (Model name: VK-X200, manufactured by Keyence Corporation). A relationship between the kind of the layer, the state of the layer, the gaps between rolls, and the surface roughness Ra in each of the examples are shown in Table 1 below. Measurement conditions <1> and <2> of the surface roughness Ra are as follows:

<1> standards defined in ISO 4288:1996; and
<2> an evaluation length of 0.8 mm.

TABLE 1

|  | Kind of Layer | State of Layer | Gap between Rolls (μm) | Surface Roughness Ra (μm) |
|---|---|---|---|---|
| Comparative Example 1 | Negative Electrode Active Material Layer | Only Application and Drying | — | 1.69 |
| Comparative Example 2 | Negative Electrode Active Material Layer | Application and Drying + Roll Pressing | 450 | 1.12 |
| Example 1 | Negative Electrode Active Material Layer | Application and Drying + Roll Pressing | 400 | 0.98 |
| Example 2 | Negative Electrode Active Material Layer | Application and Drying + Roll Pressing | 300 | 0.39 |
| Comparative Example 3 | Negative Electrode Active Material Layer | Application and Drying + Roll Pressing | 100 | 0.26 |
| Example 3 | Positive Electrode Active Material Layer | Only Application and Drying | — | 0.55 |
| Example 4 | Positive Electrode Active Material Layer | Application and Drying + Roll Pressing | 375 | 0.57 |
| Example 5 | Positive Electrode Active Material Layer | Application and Drying + Roll Pressing | 350 | 0.57 |
| Example 6 | Positive Electrode Active Material Layer | Application and Drying + Roll Pressing | 300 | 0.29 |
| Comparative Example 4 | Positive Electrode Active Material Layer | Application and Drying + Roll Pressing | 100 | 0.15 |

<Evaluation of Short-Circuiting and Internal Resistance of all-Solid-State Battery into which Electrode Laminate were Incorporated>

(Preparation of Solid Electrolyte Layer-Forming Slurry)

An electrolyte mixture as a raw material of a solid electrolyte layer was put into a polypropylene (PP) case. The electrolyte mixture was stirred for 30 seconds using an ultrasonic disperser (Model name: UH-50, manufactured by SMT Corporation) and was shaken for 30 minutes using a shaker (Model name: TTM-1, manufactured by Sibata Scientific Technology Ltd.). As a result, a solid electrolyte layer-forming slurry was prepared. The configuration of the electrolyte mixture was as follows:

Heptane as a dispersion medium;
Heptane (5 mass %) containing a BR binder as a binder; and
$Li_2S$—$P_2S_5$ glass ceramic containing LiI as a solid electrolyte (average particle size: 2.5 μm).

(Preparation of Electrode Laminate)

The solid electrolyte layer-forming slurry was applied to each of the negative electrode active material layers according to Examples 1 and 2 and Comparative Examples 1 to 3 after the measurement of the surface roughness Ra using a die coater to form a solid electrolyte layer-forming slurry layer thereon. The solid electrolyte layer-forming slurry layer was dried on a hot plate at 100° C. for 30 minutes. As a result, a negative electrode-side electrode laminate including the negative electrode current collector layer, the negative electrode active material layer, and the solid electrolyte layer was obtained.

Likewise, the solid electrolyte layer-forming slurry was applied to each of the positive electrode active material layers according to Examples 3 and 6 and Comparative Example 4 after the measurement of the surface roughness Ra using a die coater to form a solid electrolyte layer-forming slurry layer thereon. The solid electrolyte layer-forming slurry layer was dried on a hot plate at 100° C. for 30 minutes. As a result, a positive electrode-side electrode laminate including the positive electrode current collector layer, the positive electrode active material layer, and the solid electrolyte layer was obtained.

The positive electrode-side electrode laminate and the negative electrode-side electrode laminate were roll-pressed. The pressure during pressing was 13 kN/cm, the feed rate was 0.5 m/min, and the gap between rolls was 100 μm.

(Preparation of all-Solid-State Battery)

The positive electrode-side electrode laminate was punched using a punching tool having a diameter of 11.28 mm, and the negative electrode-side electrode laminate was punched using a punching tool having a diameter of 13.00 mm. The positive electrode-side electrode laminate and the negative electrode-side electrode laminate were laminated such that surfaces thereof on the solid electrolyte layer side face each other, and then were pressed. During pressing, the pressure was 200 MPa, the temperature was 130° C., and the time was 1 minute. As a result, the layers were joined to each other, and an all-solid-state battery was prepared. A relationship between the positive electrode-side electrode laminate and the negative electrode-side electrode laminate is shown in Table 2 below.

(Measurement of Internal Resistance of all-Solid-State Battery)

The internal resistance of each of the all-solid-state batteries was measured. The results are shown in Table 2 below and FIG. 1 (a drawing showing internal resistance ratios (%) of the all-solid-state batteries according to Examples 7 to 9 and Comparative Example 5). Measurement conditions of the internal resistance are as follows:

(i) Constant current-constant voltage charging (end hour rate: 1/100 C) was performed until the voltage reached 4.55 V at 3 hour rate (1/3 C);

(ii) Constant-current discharging was performed until the voltage reached 3 V;

(iii) Constant current-constant voltage charging was performed until the voltage reached 3.88 V; and (iv) Constant-current discharging was performed at a 7 C rate for 5 seconds, and the battery resistance was calculated based on a voltage drop and a current value during the discharging.

"C rate" is an index in which "1.00 C" represents a constant current value at which an all-solid-state battery having a nominal capacity is completely discharged after 1 hour. For example, "0.20 C" represents a constant current value at which the all-solid-state battery is completely discharged after 5 hours, and "0.10 C" represents a constant current value at which the all-solid-state battery is completely discharged after 10 hours.

TABLE 2

| All-Solid-State Battery | Positive Electrode-Side Electrode Laminate | Surface Roughness Ra (µm) | Negative Electrode-Side Electrode Laminate | Surface Roughness Ra (µm) | Internal Resistance Ratio (%) |
|---|---|---|---|---|---|
| Example 7 | Example 6 | 0.29 | Example 2 | 0.39 | 88 |
| Example 8 | Example 4 | 0.57 | Example 1 | 0.98 | 72 |
| Example 9 | Example 3 | 0.55 | Example 1 | 0.98 | 70 |
| Comparative Example 5 | Comparative Example 4 | 0.15 | Comparative Example 3 | 0.26 | 100 |
| Comparative Example 6 | Example 3 | 0.55 | Comparative Example 1 | 1.69 | Short-Circuiting |

Table 2 shows, by percentage, the ratios of the internal resistances of the all-solid-state batteries according to Examples 7 to 9 to the internal resistance of the all-solid-state battery Comparative Example 5 which is 100%.

In the all-solid-state battery according to Comparative Example 6, the internal resistance was not able to be measured due to short-circuiting. The reason for this is presumed to be that since the surface of the negative electrode active material layer of the negative electrode-side electrode laminate (Comparative Example 1) was rough, the thickness of the negative electrode-side solid electrolyte layer varied, that is, thin and thick portions were present in the negative electrode-side solid electrolyte layer; as a result, short-circuiting easily occurred, particularly, in a thin portion of the solid electrolyte layer.

In the all-solid-state battery according to Comparative Example 6, the positive electrode-side electrode laminate according to Example 3 was used. However, it should be noted that this electrode laminate itself had no problems. That is, the following is presumed; in the all-solid-state battery according to Comparative Example 6, short-circuiting occurred due to the negative electrode-side electrode laminate according to Comparative Example 1; and as long as short-circuiting does not occur in the negative electrode-side electrode laminate, by using the positive electrode-side electrode laminate according to Example 3, an all-solid-state battery can be realized in which short-circuiting is prevented while reducing the thickness of the solid electrolyte layer and in which the internal resistance is reduced.

In addition, it can be seen from Table 2 and FIG. 1 that the internal resistance ratio of the all-solid-state battery according to Comparative Example 5 was higher than those of the all-solid-state batteries according to Examples 7 to 9. The reason for this is presumed to be that, since the surface of the active material layer of each of the positive electrode-side electrode laminate (Comparative Example 4) and the negative electrode-side electrode laminate (Comparative Example 3) was excessively smooth, the interface resistance between the solid electrolyte layer and the active material layer increased; as a result, the internal resistance of the all-solid-state battery increased.

In regard to this point, it can be seen that, in the all-solid-state batteries according to Examples 7 to 9, the surface roughness Ra value of the active material layer of each of the electrode laminates was 0.29 µm to 0.98 µm; as a result, the all-solid-state battery was able to be realized in which short-circuiting was prevented while reducing the thickness of the solid electrolyte layer and in which the internal resistance was reduced.

The preferable embodiment of the disclosure has been described. However, those skilled in the art can understand that various modifications can be made for devices, chemicals, manufacturers and grades thereof, and the positions and dispositions of the manufacturing line which are adopted in the method according to the disclosure.

What is claimed is:

1. A method of manufacturing an all-solid-state battery, the method comprising:
    an active material layer forming step of forming a positive electrode active material layer and a negative electrode active material layer on a positive electrode current collector layer and a negative electrode current collector layer, respectively, the active material layer forming step including a pressing step;
    a solid electrolyte layer forming step of forming a solid electrolyte layer on at least one of the positive electrode active material layer and the negative electrode active material layer by applying a solid electrolyte layer-forming slurry to the at least one of the positive electrode active material layer and the negative electrode active material layer and drying the solid electrolyte layer-forming slurry; and
    a joining step of laminating the positive electrode current collector layer, the positive electrode active material layer, the solid electrolyte layer, the negative electrode active material layer, and the negative electrode current collector layer in this order and joining the positive electrode current collector layer, the positive electrode active material layer, the solid electrolyte layer, the negative electrode active material layer, and the negative electrode current collector layer to each other such that the solid electrolyte layer is interposed between the positive electrode active material layer and the negative electrode active material layer, wherein
    the positive electrode active material layer includes an amorphous sulfide solid electrolyte as a solid electrolyte;
    a thickness of the solid electrolyte layer is from 5 um to 20 um; and
    a surface roughness Ra value of a surface of the negative electrode active material layer is from 0.29 um to 0.98 um and a surface roughness Ra value of a surface of the positive electrode active material layer is from 0.29 um to 0.57 um when calculated using a laser microscope under the following measurement conditions <1> and <2>:
    <1> standards defined in ISO 4288:1996; and
    <2> an evaluation length of 0.8 mm.

2. The method according to claim 1, wherein the surface roughness Ra value of the positive electrode active material layer is 0.29 µm to 0.55 µm.

3. The method according to claim 1, wherein a positive electrode active material of the positive electrode active material layer includes a metal oxide containing at least one metal selected from lithium, manganese, cobalt, and nickel.

4. The method according to claim 3, wherein positive electrode active material includes lithium nickel manganese cobalt oxide.

5. The method according to claim 1, wherein the solid electrolyte layer includes $Li_2S-P_2S_5$ glass ceramic containing LiI as the solid electrolyte.

6. The method according to claim 4, wherein the positive electrode active material comprises $LiNi_{1/3}Mn_{1/3}CO_{1/3}O_2$.

7. The method according to claim 1, wherein the positive electrode active material comprises a buffer film.

8. The method according to claim 7, wherein the buffer film comprises lithium niobate.

9. The method according to claim 1, wherein the positive electrode active material layer includes a solid electrolyte comprising $Li_2S-P_2S_5$ glass ceramic containing LiI.

10. The method according to claim 1, wherein forming the positive electrode active material layer comprises applying a positive electrode active material layer-forming slurry to a positive electrode current collector, the positive electrode active material layer-forming slurry comprising:
    a positive electrode active material comprising a metal oxide containing at least one metal selected from lithium, manganese, cobalt, and nickel;
    a conductive additive;
    a binder;
    a solid electrolyte; and
    a dispersion medium.

11. The method according to claim 10, wherein the conductive additive comprises vapor-grown carbon fiber.

12. The method according to claim 10, wherein the solid electrolyte comprises $Li_2S-P_2S_5$ glass ceramic containing LiI.

13. The method according to claim 10, wherein the dispersion medium comprises heptane, butyl butyrate, or heptane and butyl butyrate.

14. The method according to claim 10, wherein:
    the positive electrode active material comprises $LiNi_{1/3}Mn_{1/3}CO_{1/3}O_2$;
    the conductive additive comprises vapor-grown carbon fiber;
    the binder comprises polyvinylidene fluoride;
    the solid electrolyte comprises $Li_2S-P_2S_5$ glass ceramic containing LiI; and
    the dispersion medium comprises heptane, butyl butyrate, or heptane and butyl butyrate.

15. The method according to claim 10, wherein forming the negative electrode active material layer comprises applying a negative electrode active material layer-forming slurry to a negative electrode current collector, the negative electrode active material layer-forming slurry comprising:
    a negative electrode active material comprising a natural-graphite based carbon;
    a binder comprising polyvinylidene fluoride;
    a solid electrolyte comprising $Li_2S-P_2S_5$ glass ceramic containing LiI; and
    a dispersion medium comprising heptane, butyl butyrate, or heptane and butyl butyrate.

16. The method according to claim 1, wherein forming the negative electrode active material layer comprises applying a negative electrode active material layer-forming slurry to a negative electrode current collector, the negative electrode active material layer-forming slurry comprising:
    a negative electrode active material comprising a natural-graphite based carbon;
    a binder;
    a solid electrolyte; and
    a dispersion medium.

17. The method according to claim 16, wherein the solid electrolyte comprises $Li_2S-P_2S_5$ glass ceramic containing LiI.

18. The method according to claim 16, wherein the dispersion medium comprises heptane, butyl butyrate, or heptane and butyl butyrate.

19. The method according to claim 16, wherein:
    the binder comprises polyvinylidene fluoride;
    the solid electrolyte comprises $Li_2S-P_2S_5$ glass ceramic containing LiI; and
    the dispersion medium comprises heptane, butyl butyrate, or heptane and butyl butyrate.

* * * * *

UNITED STATES PATENT AND TRADEMARK OFFICE
CERTIFICATE OF CORRECTION

PATENT NO. : 10,658,704 B2
APPLICATION NO. : 15/274191
DATED : May 19, 2020
INVENTOR(S) : Haga et al.

It is certified that error appears in the above-identified patent and that said Letters Patent is hereby corrected as shown below:

In the Claims

In Column 14, Line(s) 50 & 51, Claim 1, delete "5 um to 20 um" and insert --5 μm to 20 μm--, therefor.

In Column 14, Line(s) 53 & 54, Claim 1, delete "0.29 um to 0.98 um" and insert --0.29 μm to 0.98 μm--, therefor.

In Column 14, Line(s) 55 & 56, Claim 1, delete "0.29 um to 0.57 um" and insert --0.29 μm to 0.57 μm--, therefor.

Signed and Sealed this
Fourth Day of August, 2020

Andrei Iancu
*Director of the United States Patent and Trademark Office*